United States Patent
Citta et al.

[11] Patent Number: 5,572,547
[45] Date of Patent: Nov. 5, 1996

[54] SYSTEM FOR CONTROLLING THE OPERATING MODE OF AN ADAPTIVE EQUALIZER

[75] Inventors: Richard W. Citta, Oak Park; Larry E. Nielsen, Chicago, both of Ill.

[73] Assignee: Zenith Electronics Corporation, Glenview, Ill.

[21] Appl. No.: 539,149

[22] Filed: Oct. 4, 1995

[51] Int. Cl.⁶ .................................................. H03H 7/30
[52] U.S. Cl. .......................................... 375/232; 375/231
[58] Field of Search ................................... 375/231, 232, 375/229, 230; 364/724.19, 724.2; 333/18, 28 R; 348/691, 695, 696, 614, 914

[56] References Cited

U.S. PATENT DOCUMENTS

| | | | |
|---|---|---|---|
| 4,239,746 | 12/1980 | McCool et al. | 333/166 |
| 4,621,366 | 11/1986 | Cain et al. | 375/231 |
| 4,638,493 | 1/1987 | Bishop et al. | 375/232 |
| 5,164,962 | 11/1992 | Nakai et al. | 375/232 |
| 5,448,601 | 9/1995 | Choi | 375/232 |

*Primary Examiner*—Wellington Chin
*Assistant Examiner*—Huong Luu

[57] ABSTRACT

An adaptive equalizer decision circuit for a digital television signal, including a field synchronizing signal, consisting of multilevel symbols and a DC offset representing a pilot. The variation of the DC level of the received signal during the field sync with respect to a predetermined threshold is derived for placing the equalizer in a training signal or data directed operating mode. Another approach determines the difference between a current value of the field sync and each of a plurality of values of the field sync in previous fields and determining therefrom whether the equalizer should be in its data directed mode of operation or in its training signal mode of operation. A modification consists in controlling the step size of the equalizer based upon either the DC level variation or the field sync differences of the received signal. The modification may be used alone or in combination with the equalizer operating mode control.

19 Claims, 6 Drawing Sheets

SYSTEM FOR CONTROLLING THE OPERATING MODE OF AN ADAPTIVE EQUALIZER

CROSS REFERENCE TO RELATED APPLICATIONS

This application discloses subject matter claimed in co-pending application Ser. No. 08/539,155, filed Oct. 4, 1995, entitled "System for Controlling the Operating Mode of an Adaptive Equalizer".

BACKGROUND OF THE INVENTION AND PRIOR ART

This invention relates generally to adaptive equalizers and specifically to techniques for determining the operating mode of an adaptive equalizer. The prior art discloses two general types of automatic equalization. The first type is referred to as preset equalization in which a transmitted training signal or sequence is compared at the receiver with a locally generated training sequence, with the differences between the compared training sequences being used to set the coefficients of the equalizer. In the second, adaptive equalization method, the coefficients of the equalizer are continually and automatically adjusted based upon the received data. It is also known to use preset equalization initially to provide good channel error performance, and once normal transmission begins, to switch to an adaptive algorithm for the equalizer in which equalization is determined by the data.

Both of the foregoing equalization techniques may further be controlled by adjusting the step size (sometimes referred to as the gain factor) used to update the tap coefficients of the equalizer. A large step size will cause the equalizer to converge quickly while rendering it more sensitive to noise and other channel impairments. A smaller step size will stabilize the equalizer but reduce its operating speed. The term "operating mode" is used herein and in the claims in a broad sense to denote any method of controlling the operation of an equalizer, including selectively operating the equalizer in response to a received training signal (sequence) or received data or controlling the step size of the equalizer in either of the foregoing modes.

In the preferred embodiment of the invention, a received digital signal, which may comprise a television signal, a data signal or any other information bearing signal, is constituted by a plurality of multilevel symbols, including a fixed pseudo random sequence of symbols used as a field synchronizing signal. The received digital signal also includes a pilot comprising a DC offset characterizing the symbols. In one aspect of the invention, the field sync signal is used to determine the DC variations in the received signal, which variations are indicative of the rate of change of a received ghost component. For fixed or very slowly moving ghosts, the equalizer is operated in response to the field sync signal, which is used as a training sequence. In the presence of more rapidly moving ghosts, however, field sync directed equalization is not fast enough and a data directed operating mode for the equalizer is used. The invention is concerned with the method of determining when to switch between the field sync directed equalization mode and the data directed equalization mode.

In another aspect of the invention, a portion of the field sync is subjected to successive field delays and subtracted from the corresponding portion of the current field sync to develop values indicative of changes in the field sync over successive fields. A comparator determines when the changes occurring in successive fields are sufficiently different from a predetermined threshold level for the adaptive equalizer to be switched into its data directed mode from its field sync directed mode.

In a further aspect of the invention, the equalizer is operated in response to the field sync signal and its step size is controlled by the DC variations in the received signal or the changes in the field sync signal over successive fields. In particular, the step size of the equalizer is increased when a rapidly moving ghost is indicated and decreased when a slowly moving or stationary ghost is indicated.

OBJECTS OF THE INVENTION

A principal object of the invention is to provide an improved equalizer control circuit for a digital signal receiver.

Another object of the invention is to provide a novel arrangement for determining when to switch the operating modes of an adaptive equalizer.

A further object of the invention is to provide improved equalizer performance in a digital television receiver.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
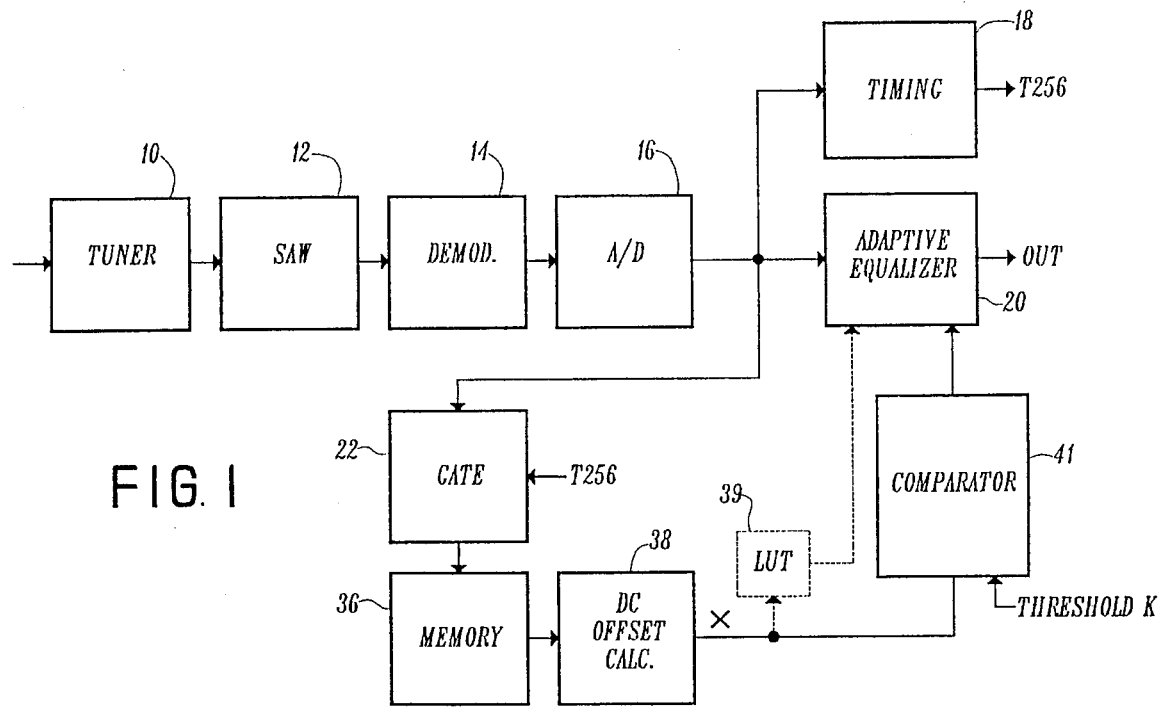
FIG. 1 is a block diagram illustrating one embodiment of the equalizer control system of the invention.

Referring to FIG. 1, a tuner 10 receives a digital signal, comprising a plurality of multilevel symbols, that includes a field sync signal or sequence. Tuner 10 is coupled to a SAW filter 12 which operates conventionally to process the intermediate frequency signal developed by tuner 10. The output of SAW filter 12 is supplied to a demodulator 14 where the signal is demodulated and applied to an analog to digital (A/D) converter 16 where the symbol levels are converted to digital values. The output of A/D 16 is coupled to a timing circuit 18 which produces an output timing signal $T_{256}$ and is coupled to an adaptive equalizer 20 that produces an equalized output for use by the remainder of the receiver (not shown) e.g. a television receiver. The output of A/D 16 is also coupled to a gate 22 that is triggered by the timing signal $T_{256}$.

Figure 2:
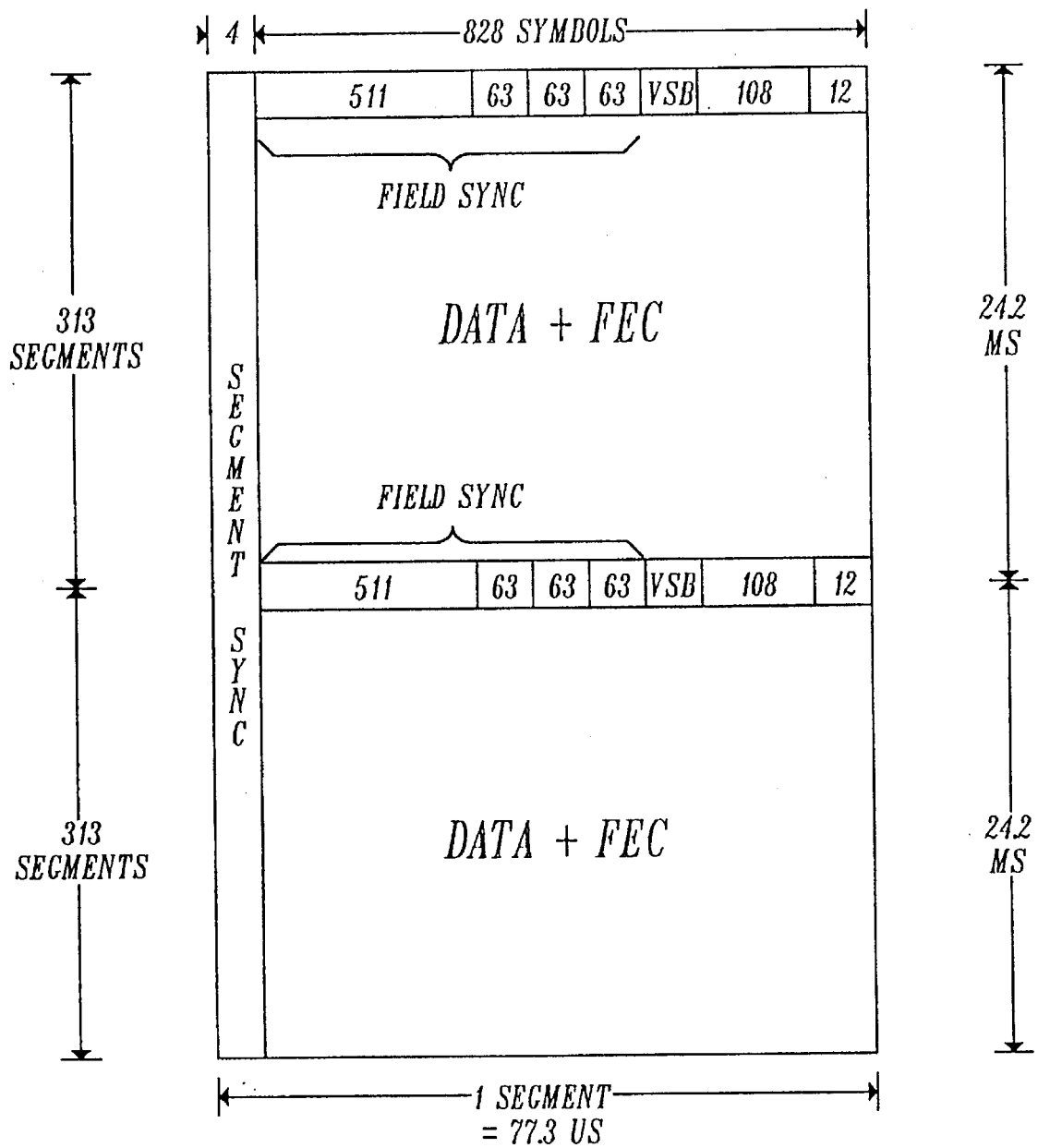
FIG. 2 is a chart showing the format of a frame of the received digital signal.

The demodulated signal preferably has the frame format illustrated in FIG. 2. Each frame comprises two fields with each field including 313 segments of 832 multilevel symbols. The first segment of each field is referred to as a field segment and the remaining 312 segments are data segments. Each data segment comprises a four symbol segment sync character followed by 828 data symbols. Each field segment comprises the four symbol segment sync character followed by a field sync component comprising a predetermined 511 symbol pseudo random number (PN) sequence and three predetermined 63 symbol PN sequences (the middle one of which is inverted in successive fields). A VSB mode control signal (defining the symbol constellation size) follows the last 63 PN sequence, which is in turn followed by 96 reserved symbols and 12 symbols copied from the previous field.

Referring back to FIG. 1, the timing signal $T_{256}$ enables the last 256 symbols of the 511 symbol pseudo random number sequence to be passed by gate 22 to a memory 36. The received signal includes a DC offset, representing a pilot that is used by the receiver to lock in the received signal by means of well known circuitry (not shown). According to one aspect of the invention, the field sync, in particular the 256 symbols passed by gate 22, is used as a training sequence and is analyzed to determine variations in the DC level of the received signal. This is accomplished via memory 36 and a DC offset calculator 38 which determines, through a software algorithm, a value X that represents the amount of variation in the DC signal level of the received signal. Value X is applied to a comparator 41 where it is compared to a threshold value K applied to comparator 41 for determining whether to place equalizer 20 in its training signal or data directed mode of operation.

Figure 3A:
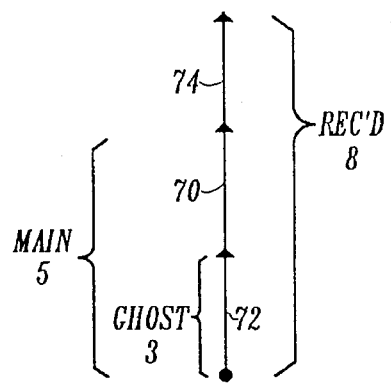
FIGS. 3A–3C are vector diagrams illustrating the relationship between the DC levels of the main component of a received digital signal and a ghost component received at various different phase angles.
Figure 3B:
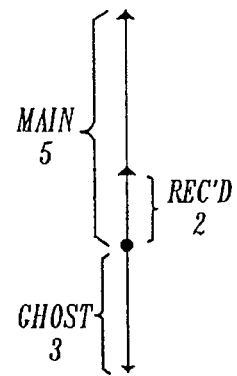
Figure 3C:
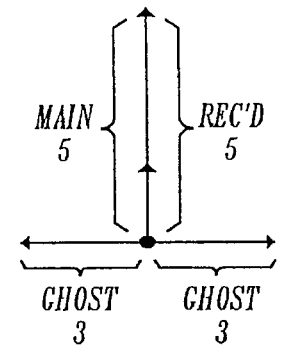

The principles of the foregoing aspect of the invention will be more readily understood with reference to FIGS. 3A–3C and FIG. 4. In FIG. 3A, the DC level of the "main" component of a received signal of 5 units is represented by a vector 70 and the DC level of an in-phase ghost of 3 units is represented by a vector 72. Therefore, the total DC level of the received signal is 8 units (represented by a resultant vector 74) since the DC levels of the main and ghost signals add together. In FIG. 3B, the ghost is 180° out of phase with the main signal and the net result is that the total DC level of the received signal is 2 units (5-3). In FIG. 3C, the DC levels of two ghosts are indicated at plus and minus 90° with respect to the main signal. Because of their phase, these ghost components have no effect on the received DC. Thus, the DC level of the main signal is the same as that of the received signal.

Figure 4:
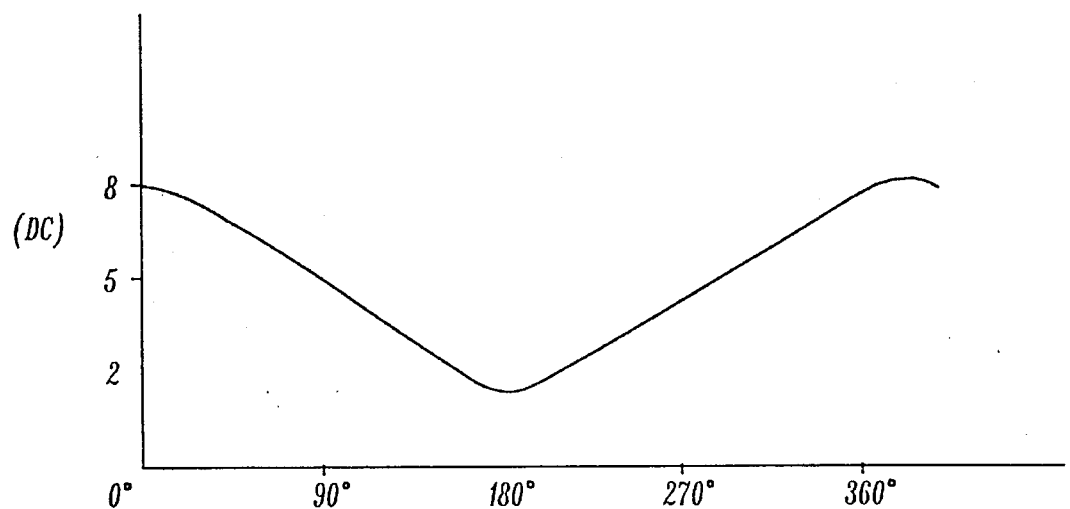
FIG. 4 is a plot of the DC level of a received signal developed from a moving ghost.

In FIG. 4, a plot shows the DC level of the received signal as a function of changes in the phase of the ghost. The DC level of the main signal is 5 units and the DC level of the ghost is 3 units as indicated in FIGS. 3A–3C. It is seen that as the phase of the ghost changes, the DC level of the received signal varies from a maximum of 8 units to a minimum of 2 units. It will thus be understood that the DC level of the received signal will vary in direct relation to the phase variation of the received ghost component. For a relatively stationary ghost, the DC level of the received signal will be relatively constant (i.e. little variation). For a moving ghost, the DC level of the received signal will vary as the phase of the ghost varies. Value X, which represents the amount of variation of the DC level of the received signal can therefore be used to control equalizer 20 by placing it in its training mode when value X is small (stationary ghost) and placing it in its data directed mode when X is large (rapidly moving ghost).

Figure 5:
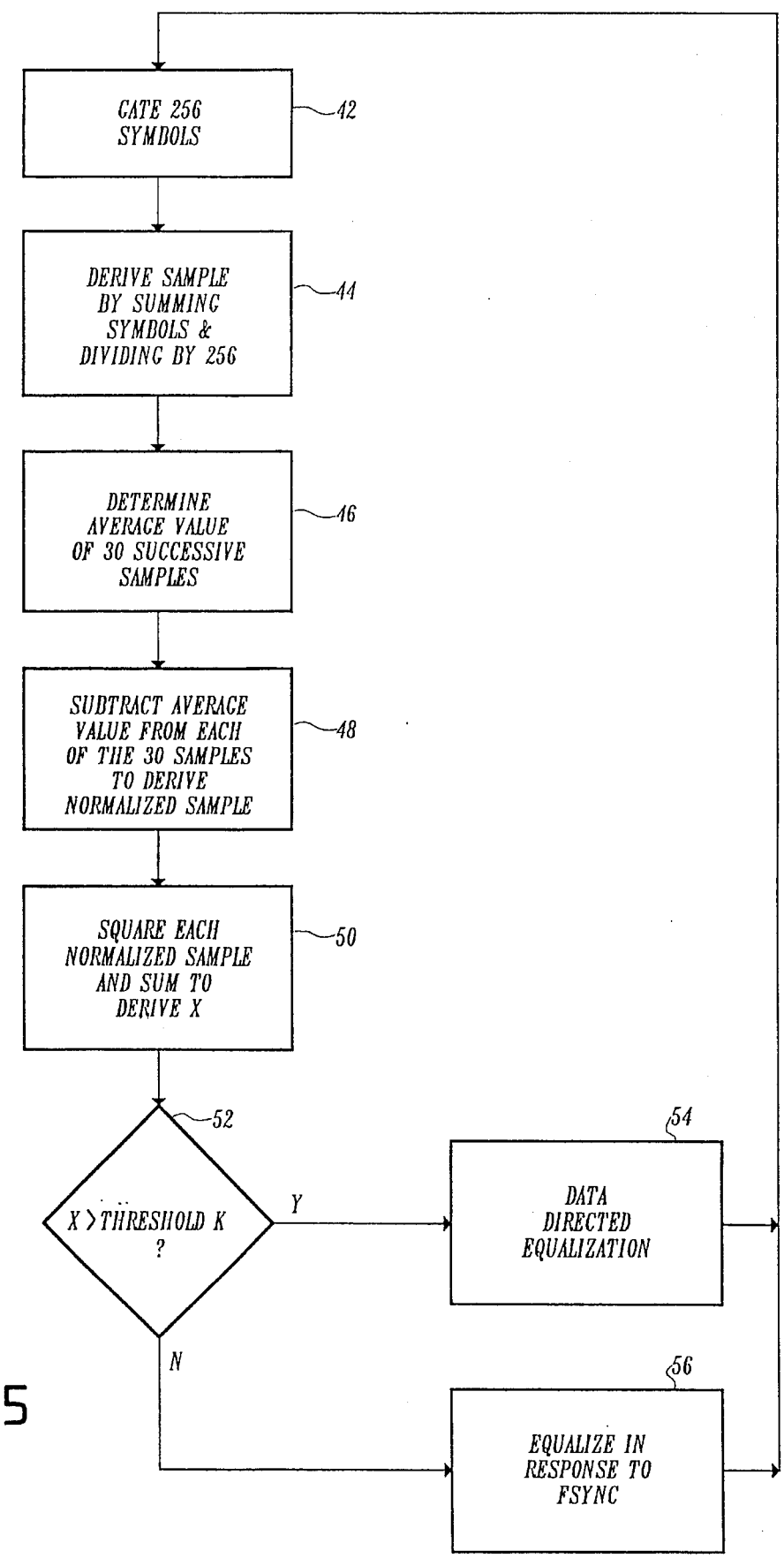
FIG. 5 is a flow chart representing the operation of the DC offset calculation circuit of FIG. 1.

The operation of DC offset calculation circuit 38 is exemplified by the flow chart of FIG. 5. Step 42 represents the operation of gate 22 for passing the last 256 symbols of each field sync for temporary storage in memory 36. In step 44 a sample is derived by summing the 256 symbols in memory 36 and dividing by 256. The values of the 256 symbols are selected to nominally add to zero in the absence of a DC component in the received signal. Therefore, if no DC component is present in the received signal the sample developed in step 44 will be zero, otherwise it will reflect the level of the received DC component. In step 46 the average value of 30 successive samples (256 symbols in each sample) from step 44 is determined. It will be understood that the number 30 (as well as the use of 256 symbols per sample) is exemplary and other values may readily be employed. The average sample value from step 46 is subtracted from each of the 30 samples in step 48 to derive corresponding samples which are normalized to zero DC. In step 50, each of the normalized samples from step 48 is squared and the squared values are summed to derive the value X, which represents the amount of variation in the DC level of the received signal and thereby the rate of change of the received ghost component. The next step 52 indicates a decision where the value X is compared to the predetermined threshold value K. If X is greater than the predetermined threshold K, equalizer 20 is placed in its data directed equalization mode as indicated by block 54, whereas, if X does not exceed the predetermined threshold K, equalizer 20 is operated in its training mode responsive to the field sync response as indicated by block 56.

Figure 6:
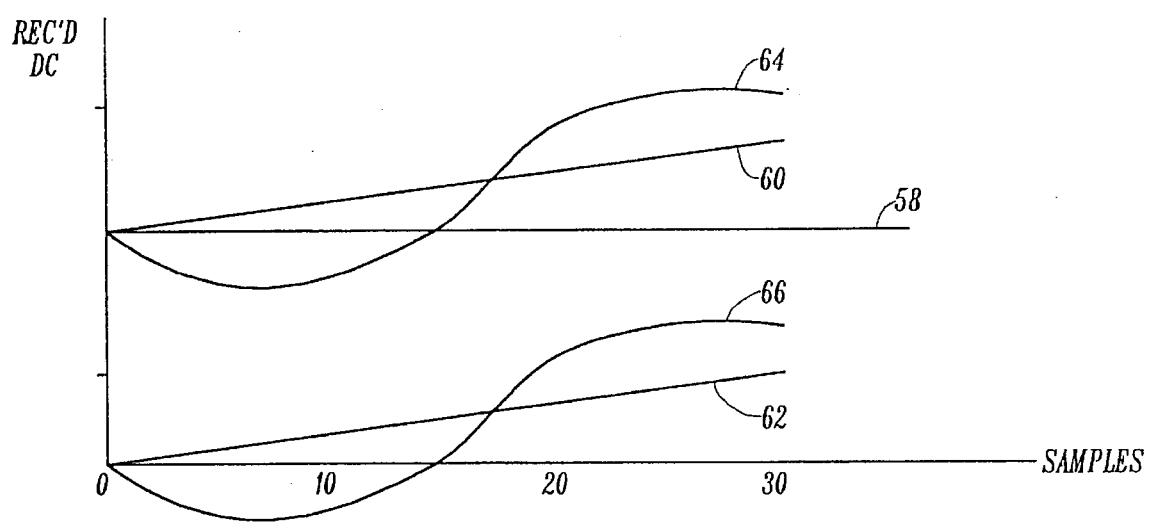
FIG. 6 shows curves indicating the operation of the offset circuit of FIG. 1.

In FIG. 6, the curves indicate examples of stationary and moving ghosts. Assuming first a stationary ghost, the 30 samples derived in step 44 will have the same value (DC level of the main signal plus the DC level of the ghost) which will equal some average value represented by curve 58. The effect of step 48 of the flow chart is to translate curve 58 to the zero axis such that the value of X equals zero. Since the value of X is less than the threshold K, equalization in response to field sync will be effected. If the ghost is moving, its phase relative to the main signal will vary as previously described and result in a variation of the DC level of the 30 samples derived in step 44. If the rate of change of the ghost is relatively slow, the amount of variation and the values of these samples will be restricted, for example, as represented by curve 60 of FIG. 6. Curve 60 is translated to the zero axis as curve 62 (step 48) which is used in step 50 to derive the value of X which, in this instance, is relatively small and less than the threshold K. Equalization is therefore again effected in response to field sync. Curve 64 of FIG. 6 represents a ghost having a relatively rapid rate of change. When this curve is translated to the zero axis as curve 66, a much larger value of X is obtained, and if X exceeds the threshold K value, a decision to perform data directed equalization is made.

A modification to the FIG. 1 circuit is illustrated by the dashed lines. The modification may be substituted for the previously described arrangement for controlling the adaptive equalizer or used in combination with it. In the dashed line modification, the value X is used to address a LUT 39 to control the step size of the equalizer. The conversion effected by LUT 39 is such that the step size will vary as a direct function of the value X, which may, for example, be linear in nature. In this way, the step size will increase to more rapidly converge equalizer 20 as the rate of change of the ghost increases. As the rate of change of the ghost decreases the step size will likewise decrease reducing the operational speed of the equalizer but making it more stable.

Figure 7:
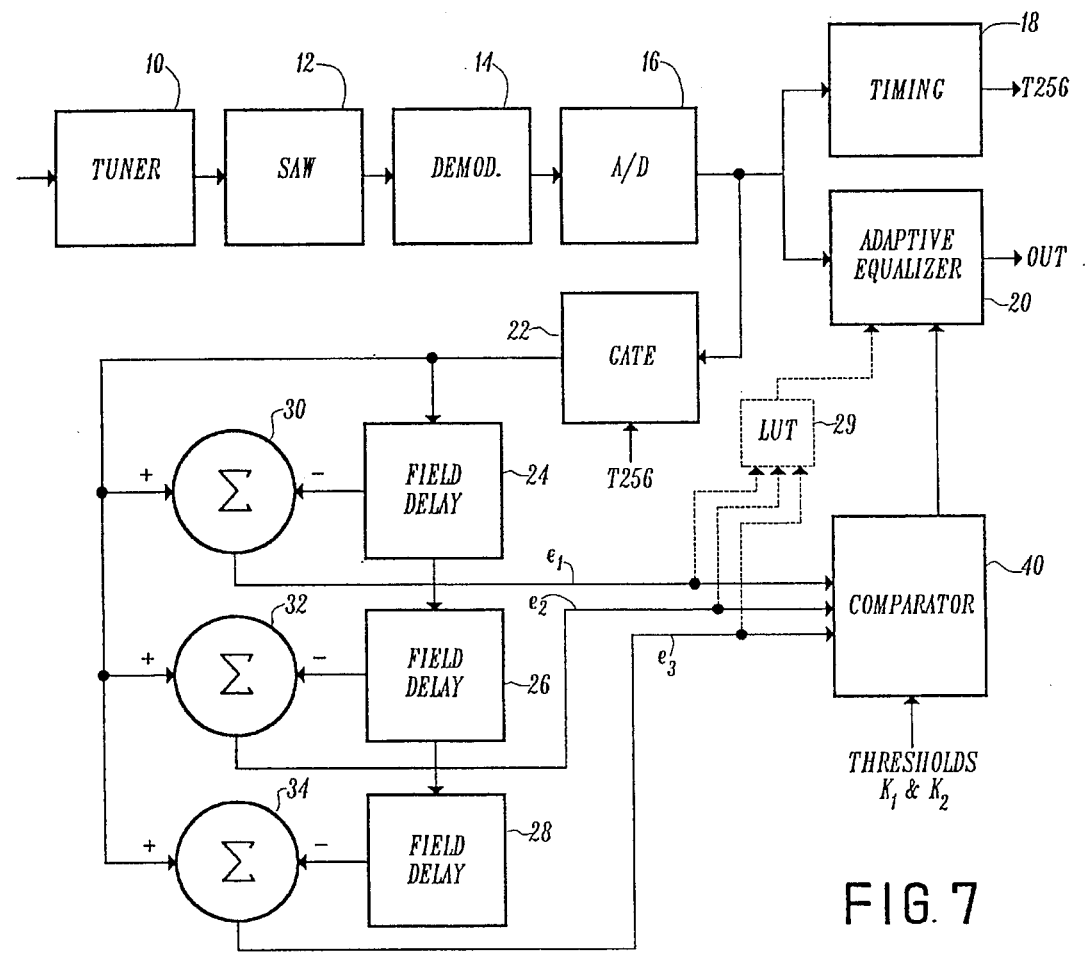
FIG. 7 is a block diagram of another embodiment of the equalizer control system of the invention.

FIG. 7, which represents the field delay or field combing technique for controlling the equalizer is seen to be identical to FIG. 1 up to gate 22. The output of gate 22 is coupled in series to three field delays 24, 26 and 28 and in parallel to three corresponding adders 30, 32 and 34 which are supplied in a subtractive manner with the outputs of field delays 24, 26 and 28, respectively. The effect is that of field combing corresponding portions of successive fields. The output of adders 30, 32 and 34 are labeled $e_1$, $e_2$ and $e_3$ respectively and are applied to a comparator 40. A pair of threshold values K1 and K2 are also applied to comparator 40. The output of comparator 40 is coupled to adaptive equalizer 20 and provides the control for determining which of the operating modes, training signal or data directed, the adaptive equalizer is to operate in.

The operation of the field delay circuits is straightforward. The gated 256 symbols are applied directly to adder 30 and subtracted from the previously gated 256 symbols to produce $e_1$ which represents the change in the 256 symbols from one field to the subsequent field. This process is repeated for the second field delay 26 and the second adder 32 where the two-field-delayed 256 symbols are subtracted from the present 256 symbols to produce output $e_2$. The third field delay 28 and the third adder 34 operate similarly to produce a three-field-delayed 256 symbol subtraction and resulting in output $e_3$. Thus, the values $e_1$, $e_2$ and $e_3$ obtained by the abovedescribed field combing represent changes in the values of the 256 symbols of the field sync over three successive fields. Comparator 40 is supplied with $e_1$, $e_2$ and $e_3$ as inputs (along with the threshold values $K_1$ and $K_2$) for generating an operating mode control signal for application to equalizer 20. In particular, if $e_3 > e_2 + K_1 > e_1 + K_2$, a relatively rapidly moving ghost is indicated and equalizer 20 is placed in its data directed mode of operation. Otherwise, equalizer 20 is placed in its training signal mode of operation in which it is operated in response to the field sync signal. Here again, a step size control modification is indicated by a LUT 29 that is supplied with $e_1$, $e_2$ and $e_3$. The modification is shown in dashed lines and, like the counterpart modification in FIG. 1, may be either used alone or in combination with comparator 40 for controlling the adaptive equalizer.

The conversion effected by LUT 29 is such that the step size will vary as a direct function of the rate of change of the received ghost as indicated by the values $e_1$, $e_2$, and $e_3$. That is, the step size applied to equalizer 20 will increase to more rapidly converge the equalizer as the rate of change of the received ghost increases and will decrease thereby stabilizing the operation of the equalizer as the rate of change of the received ghost decreases.

Figure 8:
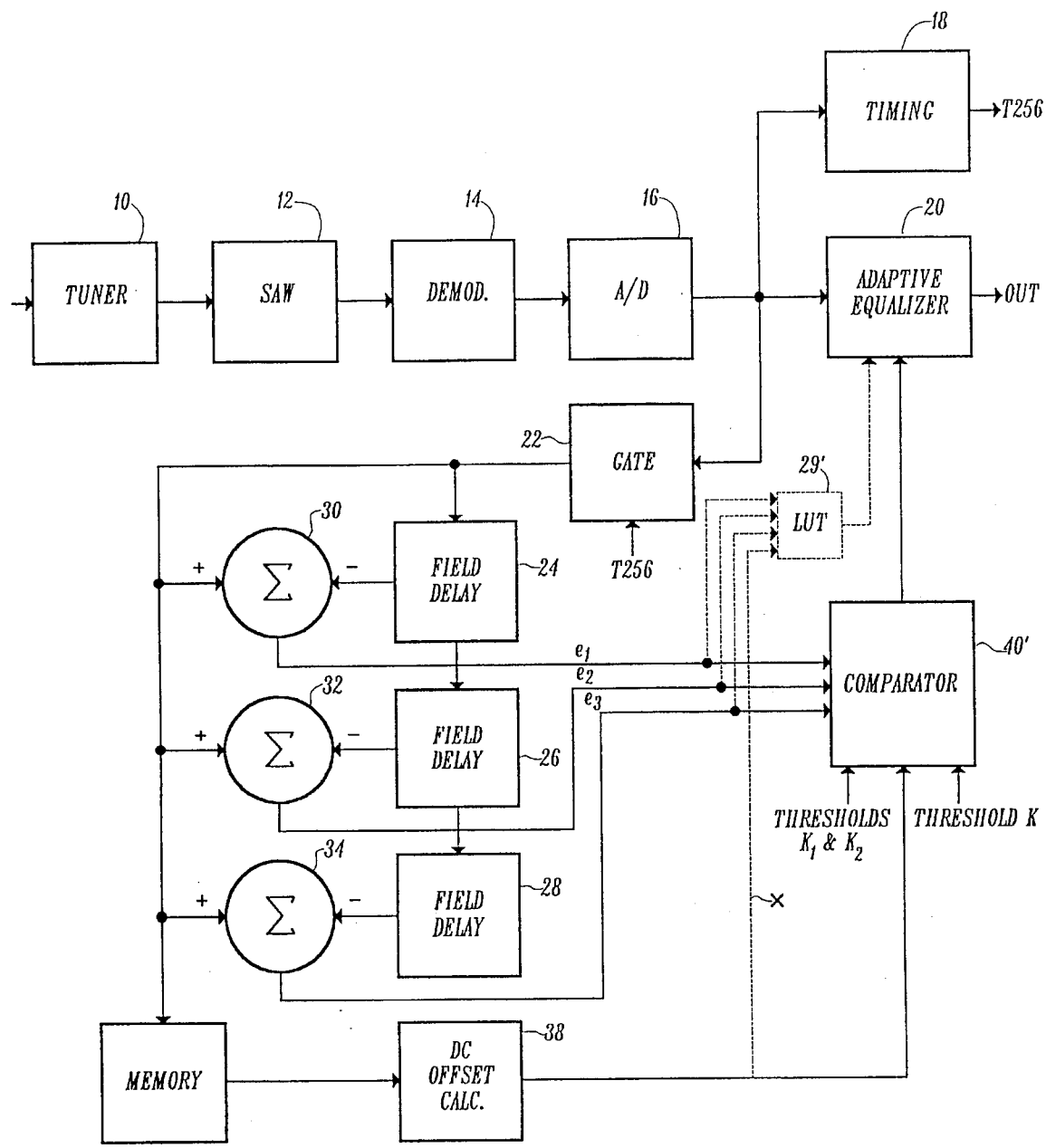
FIG. 8 is a block diagram of an embodiment of the invention using the systems of both FIGS. 1 and 7.

FIG. 8 combines the individual circuits of FIGS. 1 and 7. The value X is determined as discussed in connection with FIGS. 1 and 5. The $e_1$, $e_2$ and $e_3$ inputs are derived as indicated in FIG. 7. The value X from DC offset calculator 38, the values $e_1$, $e_2$ and $e_3$ and threshold values K, $K_1$ and $K_2$ are all applied to a comparator 40' and a determination is made in response thereto as to when to switch equalizer operating modes. The dashed line showing of LUT 29' supplied with inputs of $e_1$, $e_2$, $e_3$ and X provides the alternative (or combinational) step value control of the equalizer as discussed above.

The last half of the 511 symbol PN sequence of the field sync signal (see FIG. 2) is preferably sampled mid used in all embodiments of the invention as previously indicated. Sampling the last half (256 symbols) of the 511 symbol PN sequence is done to avoid intersymbol interference which could be caused by the random data preceding the field sync. Other selected portions of the field sync signal could also be used for this same purpose.

It is recognized that changes in the described embodiment of the invention will be apparent to those skilled in the art without departing from its true spirit and scope. The invention is to be limited only as defined in the claims.

What is claimed is:

1. A method of controlling an equalizer comprising:

determining the difference between the current value of a received periodic reference component and each of a plurality of its previously received values; and controlling the equalizer in response to the determined differences.

2. The method of claim 1 wherein the periodic reference component comprises a field sync and further including field combing the field sync with each of a plurality of previously received field syncs.

3. The method of claim 2 wherein the differences between the current value of the field sync and the values of the three previous field syncs are determined and further comprising:

comparing the differences for determining the mode of operation for the equalizer.

4. The method of claim 3 wherein the field sync comprises a pseudo random number symbol sequence and wherein the field combing processes a part of the pseudo random number symbol sequences of the field syncs.

5. The method of claim 4 wherein the processed symbol sequence is surrounded by a plurality of non-variant symbols.

6. The method of claim 1 wherein the equalizer has a data directed mode of operation and a training signal mode of operation and further comprising:

placing the equalizer in the data directed mode of operation or the training signal mode of operation as a function of the determined differences.

7. The method of claim 1 wherein the equalizer has a variable step size and further comprising:

adjusting the step size of the equalizer as a function of the determined differences.

8. The method of claim 5 wherein the equalizer has a data directed mode of operation and a training signal mode of operation and further comprising:

placing the equalizer in the data directed mode of operation or the training signal mode of operation as a function of the determined differences.

9. The method of claim 5 wherein the equalizer has a variable step size and further comprising:

adjusting the step size of the equalizer as a function of the determined differences.

10. A method of controlling an equalizer having a variable step size and having a data directed mode of operation and a training signal mode of operation, comprising:

determining the difference between the current value of a received periodic reference component and each of a plurality of its previously received values;

placing the equalizer in either the data directed mode of operation or the training signal mode of operation as a function of the determined differences; and adjusting the step size of the equalizer as a function of the determined differences.

11. The method of claim 10 wherein the periodic reference component comprises a field sync and further including field combing the field sync with each of a plurality of previously received field syncs and comparing the differences for determining the mode of operation and the step size for the equalizer.

12. A receiver for receiving a signal having a periodic reference component, and including an adaptive equalizer comprising:

means for subtracting a currently received periodic reference component from each of a plurality of previously received periodic reference components; and means responsive to the difference outputs of said subtraction means for controlling said adaptive equalizer.

13. The receiver of claim 12 further including a plurality of field delays and a corresponding plurality of adders for determining said difference outputs.

14. The receiver of claim 13 wherein said periodic reference component comprises a field sync having a predetermined number of symbols, and further including;

gate means for applying said field sync to said field delays and to said adders, respectively.

15. The receiver of claim 12 wherein said adaptive equalizer has a data directed mode of operation and a training signal mode of operation and wherein said controlling means is responsive to said difference outputs from said subtraction means for placing said adaptive equalizer in said data directed mode or in said training signal mode.

16. The receiver of claim 15 further including:

comparator means for receiving said difference outputs of said subtraction means; and a look up table for generating a signal for controlling said adaptive s equalizer based upon said difference outputs.

17. The receiver of claim 12 wherein said adaptive equalizer has a variable step size and wherein said controlling means is responsive to said difference outputs from said subtraction means for controlling the step size of said adaptive equalizer.

18. The receiver of claim 17 further including:

comparator means for receiving said difference outputs of said subtraction means; and a look up table for generating a signal for controlling said adaptive equalizer based upon said difference outputs.

19. The receiver of claim 12 wherein said adaptive equalizer has a variable step size and data directed and training signal operating modes, and wherein said controlling means is responsive to said difference outputs from said subtraction means for controlling the operating mode and step size of said adaptive equalizer.

* * * * *